US 8,261,055 B2

(12) United States Patent
Sakai

(10) Patent No.: US 8,261,055 B2
(45) Date of Patent: Sep. 4, 2012

(54) INFORMATION PROCESSING APPARATUS AND SYSTEM AND DATA COMMUNICATION METHOD PERTAINING TO THE INFORMATION PROCESSING SYSTEM

(75) Inventor: Masahiko Sakai, Kawasaki (JP)

(73) Assignee: Canon Kabushiki Kaisha (JP)

(*) Notice: Subject to any disclaimer, the term of this patent is extended or adjusted under 35 U.S.C. 154(b) by 1149 days.

(21) Appl. No.: 11/769,252

(22) Filed: Jun. 27, 2007

(65) Prior Publication Data

US 2008/0028203 A1 Jan. 31, 2008

(30) Foreign Application Priority Data

Jul. 28, 2006 (JP) ................................. 2006-207172

(51) Int. Cl.
H04L 29/06 (2006.01)
(52) U.S. Cl. ........ 713/150; 713/151; 713/152; 713/153; 713/154; 713/160; 713/161; 713/162; 713/163; 713/164; 713/165; 713/166; 713/167; 380/28; 380/29; 380/30; 380/37; 380/42; 380/43
(58) Field of Classification Search .......... 713/150–152, 713/200, 160–163, 189–193; 726/27–30; 380/37, 42–43
See application file for complete search history.

(56) References Cited

U.S. PATENT DOCUMENTS

| | | | | |
|---|---|---|---|---|
| 6,964,008 B1* | 11/2005 | Van Meter, III | ............... | 714/807 |
| 7,451,381 B2* | 11/2008 | Miller et al. | ................... | 714/774 |
| 8,081,596 B1* | 12/2011 | Buracchini et al. | ............ | 370/328 |
| 2004/0145661 A1* | 7/2004 | Murakami et al. | .......... | 348/222.1 |
| 2004/0177267 A1* | 9/2004 | Tada et al. | ...................... | 713/200 |
| 2005/0008160 A1* | 1/2005 | Izawa et al. | .................... | 380/270 |
| 2006/0034459 A1* | 2/2006 | Uchikawa | ...................... | 380/255 |
| 2007/0217424 A1* | 9/2007 | Kim et al. | ....................... | 370/392 |

FOREIGN PATENT DOCUMENTS

| | | |
|---|---|---|
| CN | 1425996 A | 6/2003 |
| JP | 2000-124950 A | 4/2000 |
| JP | 2003-099230 A | 4/2003 |
| JP | 2003-244194 A | 8/2003 |
| JP | 2005-151021 A | 6/2005 |
| JP | 2006-165847 A | 6/2006 |

OTHER PUBLICATIONS

Tzu-Chuen et. al., Information Hiding Technology Based on Block segmentation strategy, 2009, ISECS International Colloquium on Computing, Communication, Control, and Management.*
Office Action issued in corresponding Japanese Patent Application No. 2006-207172 dated May 13, 2011.
Office Action issued in corresponding Japanese Patent Application No. 2006-207172 dated Jan. 17, 2011.

* cited by examiner

Primary Examiner — Taghi Arani
Assistant Examiner — Josnel Jeudy
(74) Attorney, Agent, or Firm — Rossi, Kimms & McDowell LLP

(57) ABSTRACT

A first information processing apparatus encrypts data that it receives from a second information processing apparatus, and transmits the data thus encrypted to an external device. The second information processing apparatus transmits the data to the first information processing apparatus according to a data size that results after a data size being necessary for communication of the encrypted data is subtracted from a specified data size.

7 Claims, 12 Drawing Sheets

F I G. 5
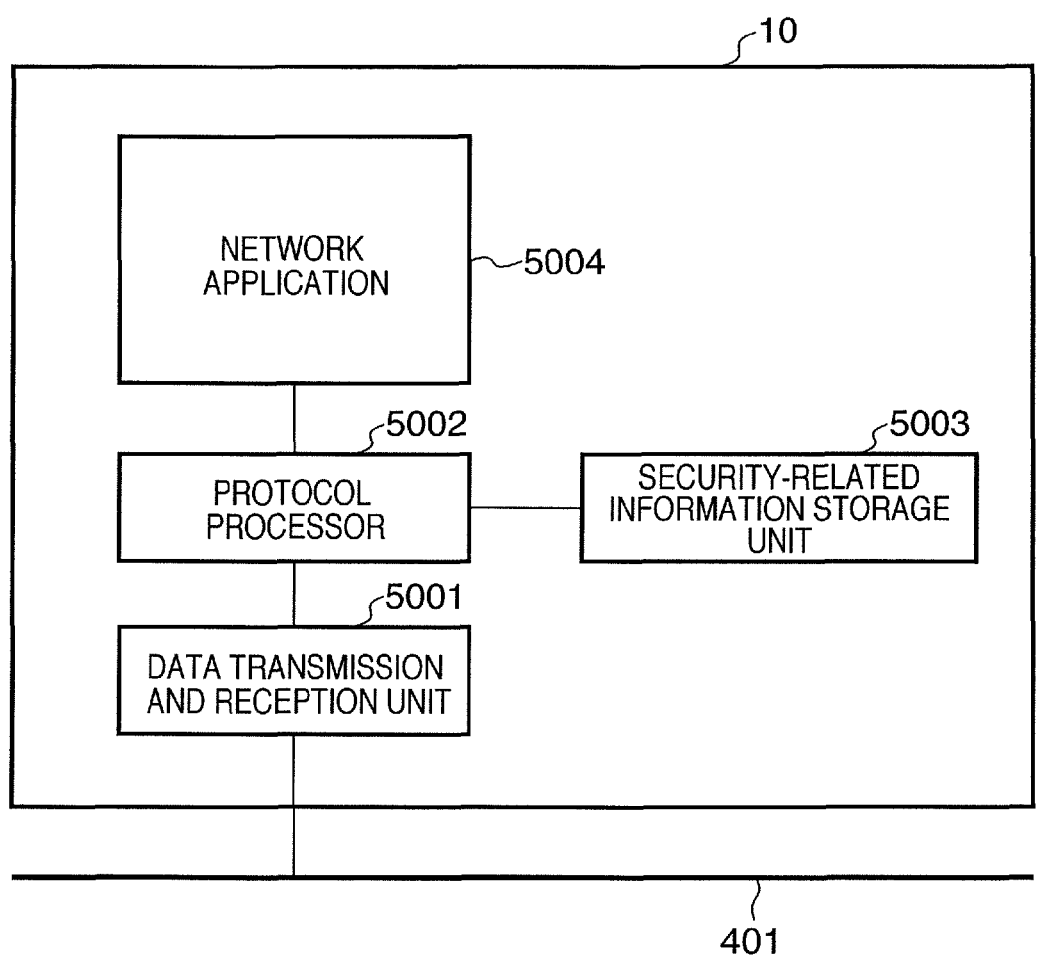

FIG. 6

| SENDER IP ADDRESS | DESTINATION IP ADDRESS | ENCRYPTION PROTOCOL |
|---|---|---|
| 2001:340:2:100::1 | 2001:340:2:200::1 | ESP |
| 2001:340:2:100::1 | 2001:340:2:200::2 | AH |
| 2001:340:2:100::1 | * | NONE |

INFORMATION PROCESSING APPARATUS AND SYSTEM AND DATA COMMUNICATION METHOD PERTAINING TO THE INFORMATION PROCESSING SYSTEM

BACKGROUND OF THE INVENTION

1. Field of the Invention

The present invention relates to an information processing apparatus, and system that includes a first and second information processing apparatuses at a minimum, and a data communication system pertaining to the information processing system.

2. Description of the Related Art

An extended control apparatus extends a function of an image processing apparatus, which possesses such functions as printing, image inputting, filing, transmitting, and receiving of documents, and image conversion. The extended control apparatus possesses a network function enhancement, which converts a data of a communications protocol of a network that is used in a user environment, that is, a LAN, to a data that is appropriate to an interface protocol that the image processing apparatus possesses. The extended control apparatus possesses such functions as a storage extension function, which spools a communications data, and a load distribution function, which performs such tasks as taking on a portion of the processing load that is performed by the image processing apparatus or a client device; refer to Japanese Patent Laid Open No. 2003-99230.

IP Security, or IPSec, is a technology specification that performs secure communication over the Internet. IPSec is set forth in a plurality of RFCS, the most important of these being RFC 2401, Security Architecture for the Internet Protocol.

In a case that the extended control apparatus employs the existing art to perform encryption and decryption processing in place of the image processing apparatus, however, the extended control apparatus encrypts a plaintext data that the image processing apparatus transmits to the extended control apparatus, and then appends a new header, called a trailer, to the encrypted data. Consequently, the size of the encrypted packet may exceed the Maximum Transfer Unit (MTU) of the receiving communications medium. In such instances, the extended control apparatus transmits the packet in question in segments, each of which is no larger than the MTU, an operation referred to as fragmentation. Performing the fragmentation, however, requires saving the packet in a buffer, extracting a portion of the packet from the buffer that is of a size that can be transmitted, and reconstructing the packet, resulting in increased overhead.

SUMMARY OF THE INVENTION

An aspect of the present invention is to eliminate the above-mentioned conventional problems.

Moreover another aspect of the present invention is that it offers a technology that avoids fragmentation, even when encrypting plaintext data.

According to the present invention, there is provided with an information processing system, including a first and a second information processing apparatuses, wherein the first information processing apparatus comprises:

a first interface configured to communicate with an external device, via a first network;

a second interface configured to communicate with the second information processing apparatus, via a second network;

an encryption unit configured to encrypt data received from the second information processing apparatus, via the second interface; and a first transmission unit configured to transmit the data encrypted by the encryption unit, to which data being necessary for communication of the encrypted data is attached, to the external device via the first interface; and the second information processing apparatus comprises:

a second transmission unit configured to transmit data to the first information processing apparatus, according to a data size after a data size of data being necessary for the communication of the encrypted data is subtracted from a specified data size.

According to the present invention, there is provided with a data communication method in an information processing system including a first and a second information processing apparatuses, comprising the steps of:

encrypting data received from the second information processing apparatus, by the first information processing apparatus;

transmitting the data encrypted in the encrypting step, to which data being necessary for communication of the encrypted data is attached, from the first information processing apparatus to the external device; and transmitting data from the second information processing apparatus to the first information processing apparatus, according to a data size after a data size of the data being necessary for the communication of the encrypted dat is subtracted from a specified data size.

According to the present invention, there is provided with an information processing apparatus for communicating with another information processing apparatus that encrypts and transmits data to an external device, comprising:

a data segmentation unit configured to segment data according to a data size after a data size of a data being necessary for communication of the encrypted data is subtracted from a specified data size; and a transmission unit configured to transmit data segmented by the data segmentation unit to other information processing apparatus.

Further features of the present invention will become apparent from the following description of exemplary embodiments, with reference to the attached drawings.

BRIEF DESCRIPTION OF THE DRAWINGS

The accompanying drawings, which are incorporated in, and constitute a part of, the specification, illustrate embodiments of the invention, and, together with the description, serve to explain the principles of the invention.

FIG. 5 is a block diagram illustrating a detailed configuration of a network service of the image processing apparatus, according to the embodiment.

FIG. 6 depicts a view illustrating an example of an SPD, according to the embodiment.

DESCRIPTION OF THE EMBODIMENTS

Embodiments of the present invention will now herein be described in detail, with reference to the accompanying drawings. It should be noted that the following embodiments are not intended to limit the present invention set forth in the claims, and that not all of the combinations of features described in the embodiments are necessarily essential as means for attaining the objects of the invention.

Figure 1:
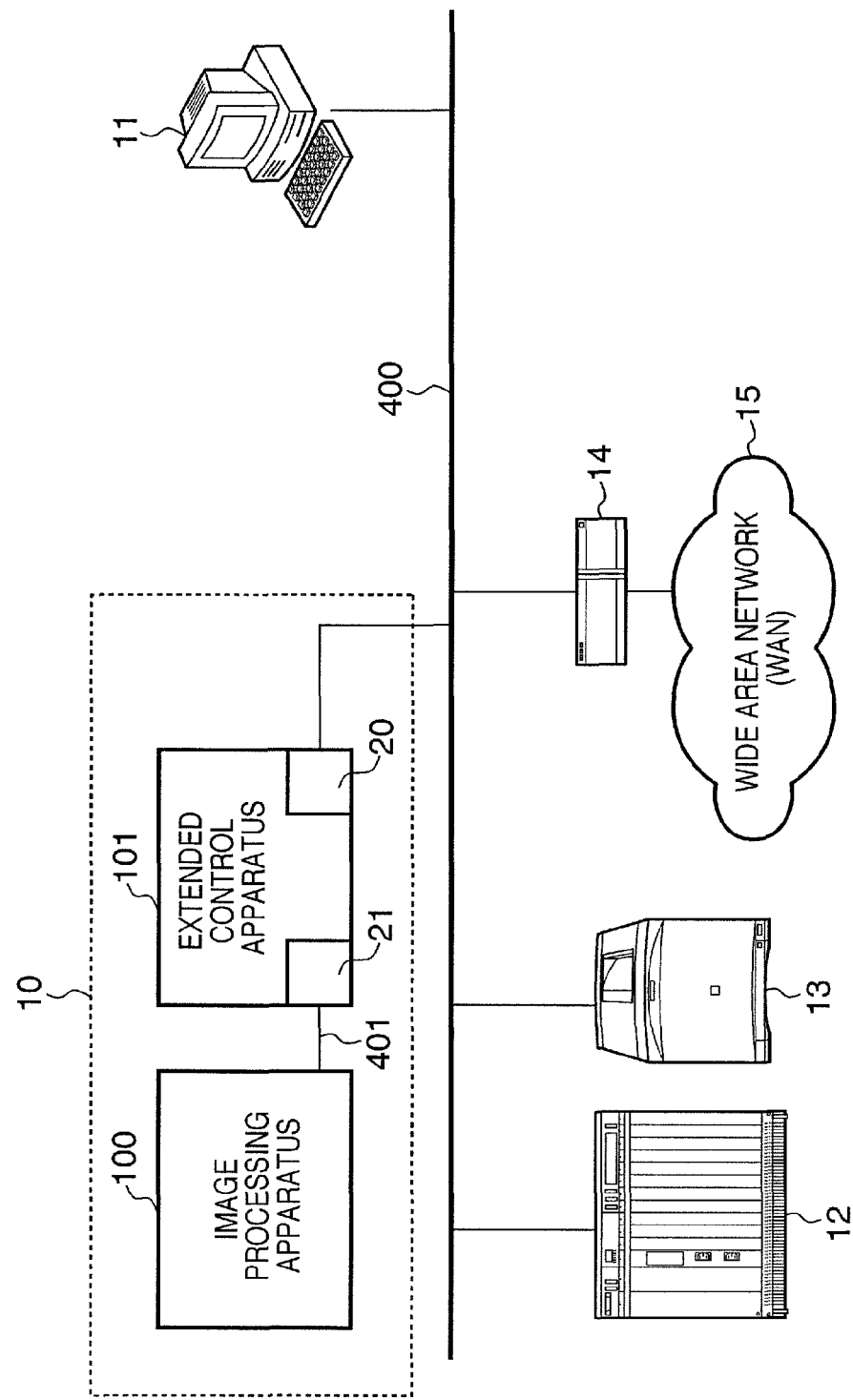
FIG. 1 is a conceptual diagram illustrating an example of a network environment wherein an extended image processing system is used, according to an exemplary embodiment of the invention.

FIG. 1 is a conceptual diagram illustrating an example of a network environment wherein an extended image processing system is used, according to an exemplary embodiment of the invention.

An extended image processing system 10 possesses an image processing apparatus 100 and an extended control apparatus 101. The image processing apparatus 100 possesses such functions as printing, image inputting, filing, transmitting, and receiving of documents, and image conversion, and the extended control apparatus 101 offers further extended functions thereto. A first network interface 20 of the extended control apparatus 101 is connected to a LAN 400, and is capable of communicating with another network node, via the LAN 400. A second network interface 21, which is between the image processing apparatus 100 and the extended control apparatus 101, is connected via a LAN 401.

A host computer (PC) 11 is an information processing apparatus for an individual user. Placed on the user's desktop, it executes a range of application programs. Connected to the LAN 400, the host computer 11 uses a service that another network node provides, as well as offering a service to the other network node, over the LAN 400. A server computer 12 is a large-scale information processing apparatus. Connected to the LAN 400, the server computer 12 primarily offers the service to the other network node, over the LAN 400. A printer 13 is a peripheral device with network support. Connected to the LAN 400, the printer 13 offers a printing service to the other network node, over the LAN 400. A router 14 is a network node that connects a network to another network. It connects a Wide Area Network (WAN) 15, such as the Internet or a virtual private network (VPN), to the LAN 400. In the present circumstance, the LAN 400 is a Local Area Network that is set up in, for example, the user's office.

The following is a basic description of IP Security (IPSec), which is used according to the embodiment. IPSec allows implementing the following functions:

Access Control: performing permission or rejection on a connection, in accordance with, for example, an address of a connecting node;

Certification of Integrity of Communication Data: certifying that the communication data has not been tampered with in the course of being communicated; and Confidentiality of Communication Content: encrypting the communication data, thus rendering the communication data such that the content thereof cannot be easily distinguished, even if intercepted in the course of being communicated.

IPSec is configured of a plurality of technologies, in order to implement the functions.

IPSec employs security protocols known as an Authentication Header (AH) and an Encapsulating Security Payload (ESP). AH employs authentication, that is, certification of integrity, and ESP employs encryption, that is, implementing the confidentiality of the data. AH is set forth in RFC 2402, and ESP in RFC 2406, respectively. AH and ESP each have two modes, known as a transport mode and a tunneling mode. The transport mode treats a payload component of an IP packet as subject to security protocol processing, whereas the tunneling mode treats the IP packet as a whole as subject to processing.

IPSec employs a set of parameters called a Security Association (SA) to manage such as a key or an encryption algorithm. A database that manages the SA is called a Security Association Database (SAD). The parameters of the SA include: an identifier for communicating between each of two points, a Security Parameter Index (SPI), a type of security protocol, the encryption algorithm and the key thereof, a lifetime of the SA, and a value and counter of an IV that is employed by the encryption algorithm. The SA has an orientation, requiring two SAs to perform bi-directional communication.

A security policy typically refers to an action policy that signifies what to protect, how to protect it, and what to protect it from. The IPSec Security Policy (SP) denotes what sort of IP packet to apply IPSec to. The parameters of the SP include: an IP layer protocol number, an IP address, a network address, a transport layer protocol, a port number, and a user identifier. A database that manages the SP is called a Security Parameter Database (SPD).

Performing the IPSec requires sharing both the parameters of the SA between the two points that are communicating, and the key that is used in the encryption algorithm. IPSec defines a manual key management and an automatic key management as a management method thereof.

IPSec employs an Internet Key Exchange (IKE) as the automatic key management method. Set forth in RFC 2409, the IKE comprises two phases: a phase one, which exchanges the SA of the IKE proper, and a phase two, which securely exchanges the parameters of the IPSec SA under the SA that is established in the phase one. A digital signature, a public key encryption, and a pre-shared key are defined in the phase one as an authentication protocol, and the programs that execute the IKE select and employ one of the three authentication protocols.

Figure 2:
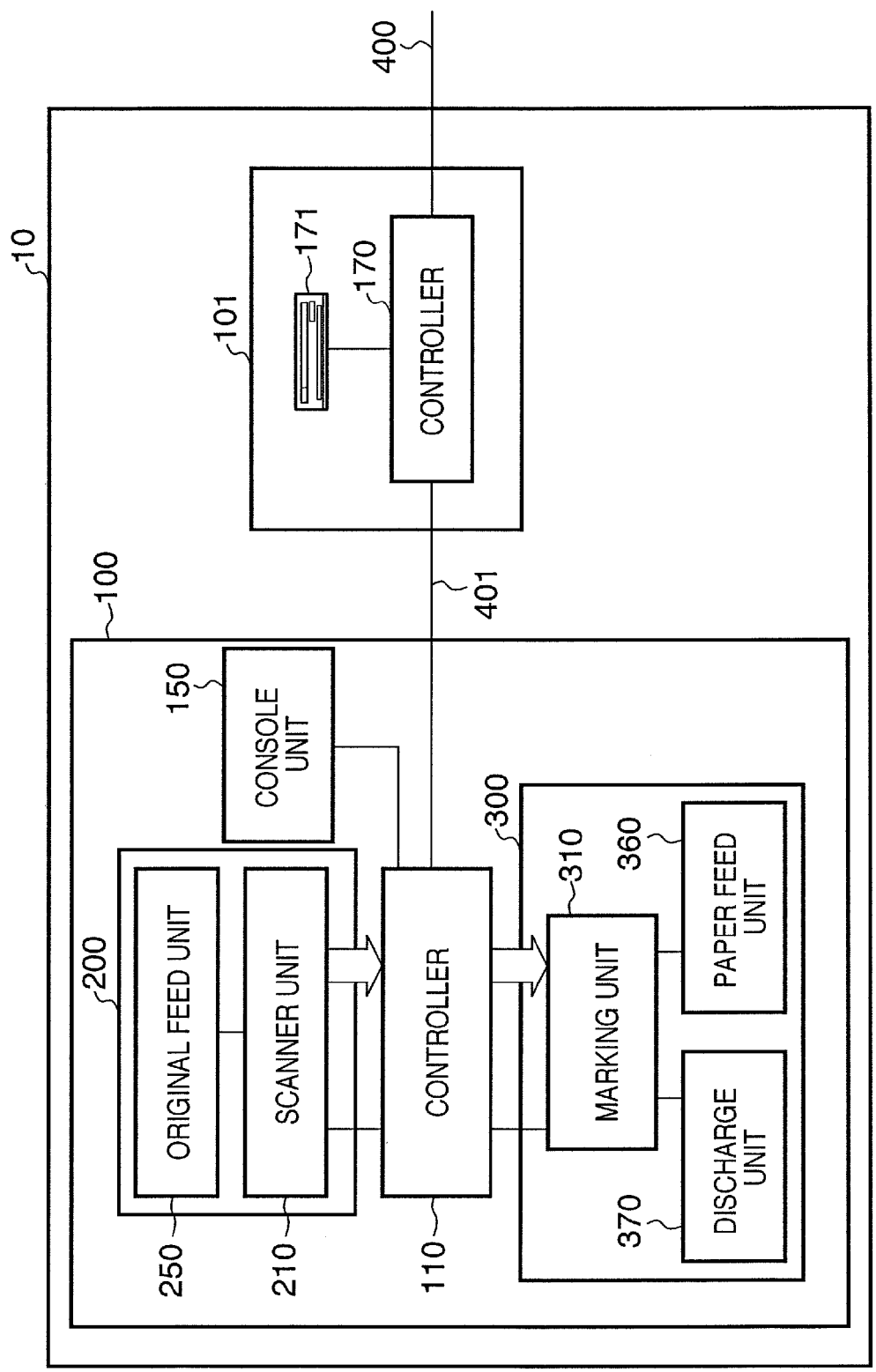
FIG. 2 is a block diagram illustrating a configuration of the extended image processing system, which is configured of an extended control apparatus and an image processing apparatus, according to the embodiment.

FIG. 2 is a block diagram illustrating a configuration of the extended image processing system 10, which is configured of the image processing apparatus 100 and the extended control apparatus 101, according to the exemplary embodiment.

The image processing apparatus 100 offers such basic functions as printing, image inputting, filing, transmitting, and receiving of documents, and image conversion. A reader unit 200, that is, an image input apparatus, optically reads in an original image, and converts the original image to an image data. The reader unit 200 is configured of a scanner unit 210, which reads in an original, and an original feed unit 250, which possesses a function that conveys the original.

A printer unit 300, that is, an image output apparatus, conveys a sheet of recording paper, prints the image data thereupon in as a visible image, and discharges the result from the apparatus. The printer unit 300 possesses a paper feed unit 360, with a plurality of types of recording paper cartridges, a marking unit 310, with a function of transferring and fixing the image data to the recording paper, and a discharge unit 370, with a function of sorting, stapling, and discharging the printed recording paper from the device.

A controller 110 is electronically connected to the reader unit 200, the printer unit 300, and the LAN 401. The controller 110 offers a copying function of controlling the reader unit 200 to read in the image of the original, and of controlling the printer unit 300 to print a visible image on the recording paper, in accordance with the image data. The controller 110 also offers a scanner function of converting the image data of the image that is read in by the reader unit 200 into a code data, and transmits the code data to a client apparatus (not shown) over the LAN 401. The controller 110 also offers a print function of converting the code data that is received from the client apparatus over the LAN 400 into the image data, outputting the image data to the printer unit 300, and causing the image to be printed thereby.

A console unit 150, which is connected to the controller 110 and possesses an LCD touch screen, offers a user interface for operating the extended image processing system 10. The extended control apparatus 101 includes a controller 170 and a peripheral device 171. The controller 170 of the extended control apparatus 101 is capable of executing software, including an operating system, a variety of device drivers, and a variety of application programs. The peripheral device 171 is a variety of peripheral devices that are used to extend the hardware of the extended control apparatus 101. In the present circumstance, the image processing apparatus 100 and the extended control apparatus 101 are capable of bi-directional communication, being connected over the LAN 401.

Figure 3:
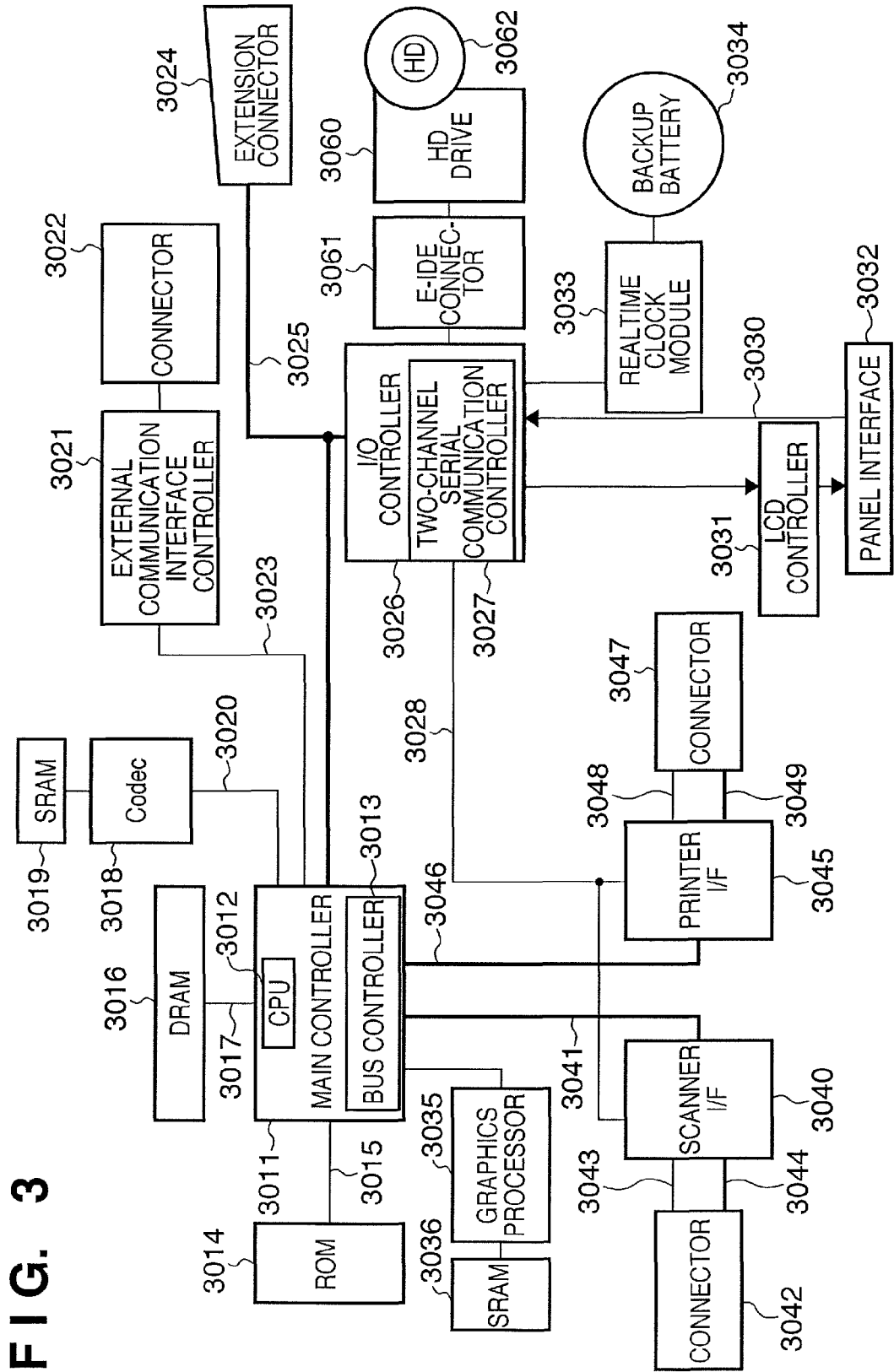
FIG. 3 is a block diagram illustrating a hardware configuration of a controller of the image processing apparatus, according to the embodiment.

FIG. 3 is a block diagram illustrating a hardware configuration of the controller 110 of the image processing apparatus 100, according to the embodiment.

A main controller 3011 possesses a CPU 3012, a bus controller 3013, and a variety of interface controller circuits. The CPU 3012 and the bus controller 3013 control the overall operation of the controller 110. The CPU 3012 operates in accordance with a program that is loaded from a ROM 3014, via a ROM interface 3015. The program also defines an operation that processes, in software, the interpretation of a Page Description Language (PDL) code data that is received from a client apparatus, and the rendering of the code data into a raster image data. The bus controller 3013 controls a transfer of data that is input and output via each respective interface. It performs control of an arbitration of a bus conflict or a DMA data transfer. A DRAM 3016 is connected via a DRAM interface 3017 to the main controller 3011. It serves as a workspace for the operation of the CPU 3012, as well as for storing the image data.

A codec 3018 compresses the raster image data that is stored in the DRAM 3016, according to such protocols as MH, MR, MMR, JBIG, or JPEG, and restores the code data thus compressed and stored into the raster image data. An SRAM 3019 is used as a temporary workspace for the codec 3018, which is connected via an interface 3020 to the main controller 3011. The transfer of data between the codec 3018 and the DRAM 3016 is the DMA transfer, controlled by the bus controller 3013.

A graphics processor 3035 performs such processes on the image data that is stored in an SRAM 3036 as an image rotation, a scaling process, or a color space conversion. The graphics processor 3035 is also capable of writing the result of the process to the SRAM 3036. An external communication interface controller 3021 is connected via an interface 3023 to the main controller 3011, and via a connector 3022 to the network.

An extension connector 3024 and an I/O controller 3026 are connected to a universal high speed bus 3025, which is for connecting an extension board. A PCI bus is typically cited as the universal high speed bus 3025. The I/O controller 3026 is furnished with two channels of an asynchronous serial communication controller 3027, which is for bi-directional communication of control commands with a CPU in each of the reader unit 200 and the printer unit 300, respectively. The I/O controller 3026 is connected via an I/O bus 3028 to an external interface 3040 and 3045.

A panel interface 3032 is connected to an LCD controller 3031, an interface that performs a display on the LCD of the console unit 150, and a key input interface 3030, which performs a hardware key or a touch screen input. The console unit 150 possesses an LCD unit, a touch screen input apparatus that is attached atop the LCD unit, and, a plurality of hardware keys. A signal that is input via the touch screen or the hardware key is transmitted via the panel interface 3032 to the CPU 3012. The LCD unit displays the image data that is transmitted via the panel interface 3032. The LCD unit also displays such as a function display pertaining to the operation of the image processing apparatus 100.

A real-time clock module 3033 updates and stores the date and time that is managed within the apparatus. It is independently powered by a dedicated backup battery 3034. An E-IDE interface 3061 connects with an external storage apparatus. A hard disk (HD) drive 3060, which is connected via the interface according to the embodiment, performs such operations as storage of the image data to a hard disk (HD) 3062, and reading of the image data from the hard disk 3062.

Connectors 3042 and 3047 connect to the reader unit 200 and the printer unit 300, respectively, as well as to an asynchronous serial interface 3043 and 3048, and a video interface 3044 and 3049. A scanner interface 3040, which is connected via the connector 3042 to the reader unit 200, as well as via a scanner bus 3041 to the main controller 3011, possesses a function that performs a prescribed process on the image data that is received from the reader unit 200. The scanner interface 3040 possesses a function of outputting a control signal that is generated in accordance with a video control signal that is transmitted from the reader unit 200 to the scanner bus 3041. The transfer of data from the scanner bus 3041 to the DRAM 3016 is controlled by the bus controller 3013.

The printer interface 3045 is connected via the connector 3047 to the printer unit 300, as well as via a printer bus to the main controller 3011. The printer interface 3045 possesses a function of carrying out a prescribed process on the image data that is transmitted from the main controller 3011, and outputting the result to the printer unit 300. The printer interface 3045 possesses a function of outputting a control signal that is generated in accordance with a video control signal that is transmitted from the printer unit 300 to the printer bus 3046. The transfer of the raster image data that is rendered in the DRAM 3016 to the printer unit 300 is controlled by the bus controller 3013 to be a DMA transfer via the printer bus 3046 and the video interface 3049 to the printer unit 300.

Figure 4:
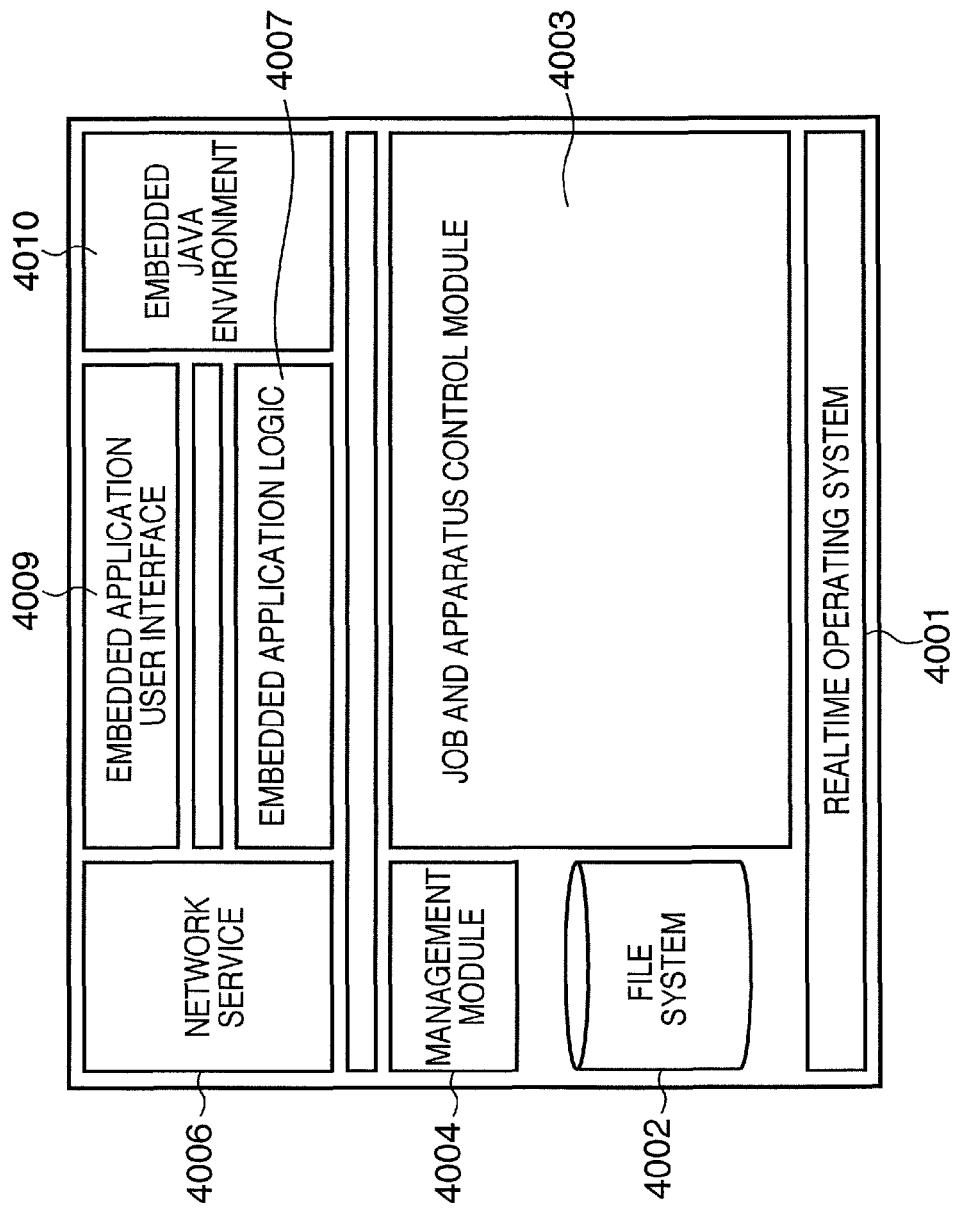
FIG. 4 is a block diagram illustrating a software module that is implemented in the controller of the image processing apparatus, according to the embodiment.

FIG. 4 is a block diagram illustrating a software module that is implemented in the controller 110 of the image processing apparatus 100, according to the embodiment.

The software that is processed by the controller 110 of the image processing apparatus 100 is implemented as firmware, and executed by the CPU 3012 of the image processing apparatus 100. A real-time operating system 4001 offers a variety of resource management services and frameworks for software running on the operating system, which are optimized for controlling an embedded system. The variety of resource management services and frameworks that the real-time operating system 4001 offers include a multitasking, or thread, management, which effectively causes a plurality of processes to operate in parallel, owing to the CPU managing a plurality of process execution contexts. Also included therein are such as a protocol stack, which implements a process of a range of protocols, such as inter-task communication, which implements synchronization or interchange of data between tasks, memory or interrupt management, a range of device drivers, a local interface, a network, or communication.

A file system 4002 is a system that is built in a storage apparatus, such as a hard drive or a memory, for storing data. It is used to spool a job, or store a variety of types of data, that the controller 110 is handling.

A job and apparatus control module 4003 controls the software of the image processing apparatus 100, as well as a job that uses the fundamental functions, such as printing, scanning, communication, and image conversion, that are primarily offered in the hardware of the image processing apparatus 100. A management module 4004 manages the operation of the controller, such as controlling an internal status as pertains to the operation of the controller 110.

A network service 4006 uses a bi-directional conversion of a control API and a network protocol to facilitate the use of the fundamental functions of the apparatus from a network node that is external thereto, such as a client PC. An embedded application logic 4007 and an embedded application user interface 4009 configure an embedded application. The embedded application user interface 4009 implements such higher order functions as copying, image scanning, and filing, transmitting, and receiving of documents, in addition to the fundamental functions of the image processing apparatus 100. The embedded application logic 4007 corresponds to a business logic component of the embedded application. The embedded application user interface 4009, which corresponds to a presentation logic of the embedded application, performs a control of a display or input of a graphical user interface (GUI) to facilitate an operation by the user of the embedded application. The embedded application user interface 4009 also offers a Web application that is implemented using a Web technology, such as HTTP, and a markup language, such as HTML, in addition to a local user interface on the console unit 150 of the image processing apparatus 100.

The user is able to operate the image processing apparatus 100 remotely via a Web browser running on, for example, a client PC and connecting to the Web application. In the present circumstance, a presentation layer of the embedded application that is implemented as the Web application is referred to as a remote user interface.

An embedded Java environment 4010 is an interpreter environment that is primarily configured of a Java Virtual Machine (VM). The embedded Java environment 4010 is configured to load and bind instruction sequence data that is written in Java byte-code at the time of execution, and have the Java VM load, interpret, and execute the instruction in sequence. Accordingly, the software is preloaded in full, including the real-time operating system 4001, in a prebound firmware, and scalability and flexibility can be assured, such that the software can be dynamically added or replaced in small components.

A Java class library suite, which is configured to allow the use of the resources or services of the firmware, that is, a native system, including such as the real-time operating system 4001 and the job and apparatus control APIs, is offered via a Java Native Interface (JNI). A fundamental component of the embedded Java environment 4010 is built from a commonly known Java 2 Platform, Micro Edition.

The embedded application logic 4007 of the image processing apparatus 100 is capable of control from the presentation logic that is implemented in the application of the extended control apparatus 101.

A flag, which is stored in such as a non-volatile memory (not shown), and which controls whether or not to link to the extended control apparatus 101, is also built into the image processing apparatus 100.

The following is a description of a detailed configuration of the network service 4006, with reference to FIG. 5.

FIG. 5 is a block diagram illustrating a detailed configuration of the network service 4006 of the image processing apparatus 100, according to the exemplary embodiment.

A data transmission and reception unit 5001 performs transmission and reception of the variety of data types, via the network 401. A protocol processor 5002 uses a network protocol such as TCP/IP to communicate with the extended control apparatus 101 or the host computer in FIG. 1. According to the embodiment, a network application 5004 transmits the data via e-mail to a specified recipient, and uses a protocol, such as File Transfer Protocol (FTP) or Server Message Block (SMB), to transmit data to a specified host computer or fileserver.

The network application 5004 comprises a network server function that implements a variety of network printing protocols, such as LPR, NetWare, SMB, PAP, or IPP, allowing inputting of a print job from a network node that is external to the apparatus, such as a client PC. A security-related information storage unit 5003 stores the Security Policy Database (SPD).

FIG. 6 depicts a view of an example of the data of the SPD that is stored in the security-related information storage unit 5003, according to the embodiment.

The SPD is initially specified by the user in the extended control apparatus 101, and transferred to the image processing apparatus 100, according to the embodiment.

Figure 7:
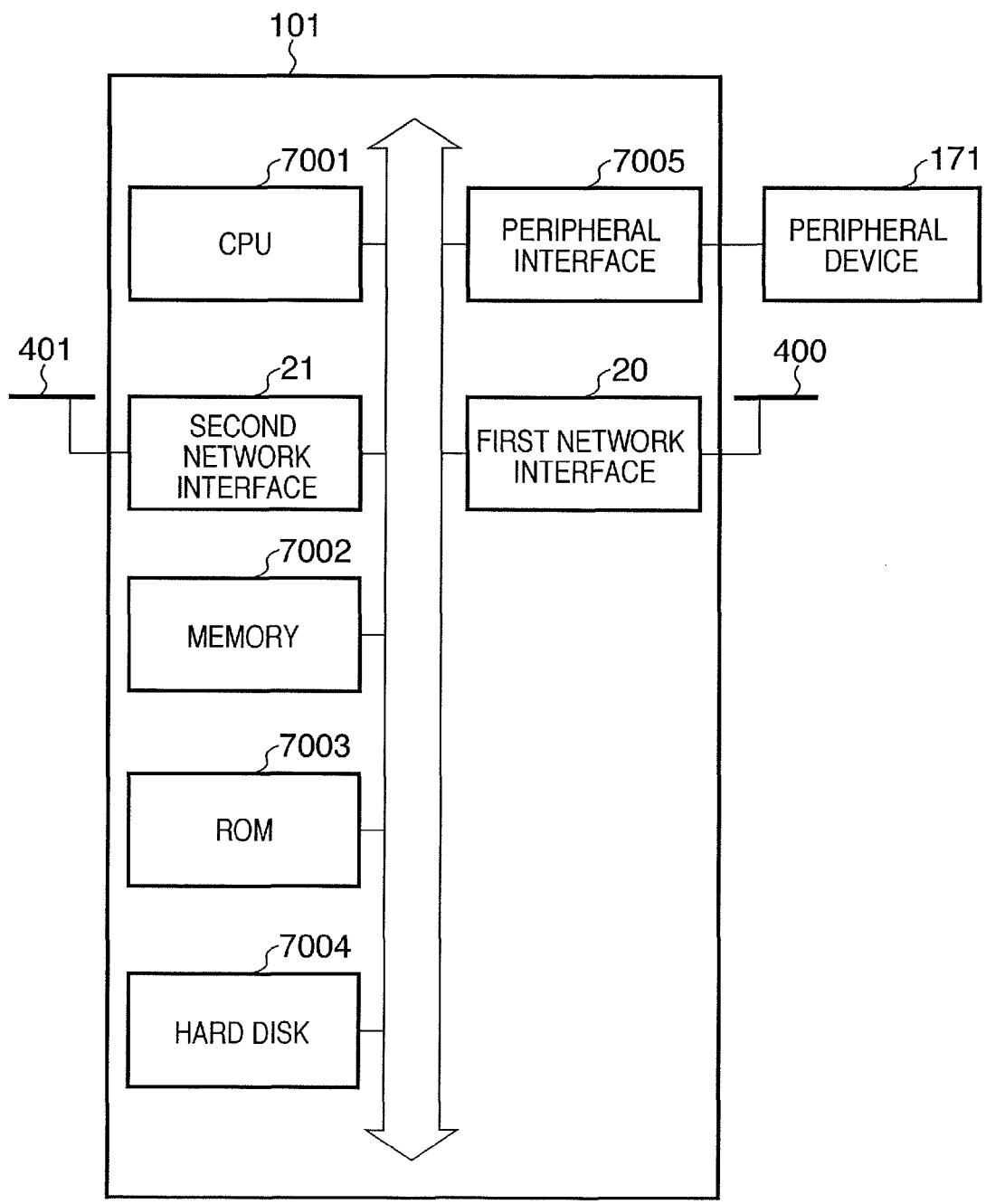
FIG. 7 is a block diagram illustrating a hardware configuration of the extended control apparatus, according to the embodiment.

FIG. 7 is a block diagram illustrating a hardware configuration of the extended control apparatus 101, according to the embodiment.

A CPU 7001 is a central processing unit that performs overall control, executing a program that is loaded into a memory 7002 from a ROM 7003 or a hard disk 7004. The first network interface 20 is a controller that performs a data communication with another device, via the LAN 400. The software that is executed by the CPU 7001 performs a bi-directional handling of data between the extended control apparatus 101 and other network devices or other computers over the LAN 400. The second network interface 21 is a controller that performs data communication between the extended control apparatus 101 and the image processing apparatus 100, over the LAN 401. It is possible for the software that is executed by the CPU 7001 to perform a bi-directional handling of data between the extended control apparatus 101 and the image processing apparatus 100, over the LAN 401. The memory 7002 is a temporary volatile storage space for holding, for example, the instruction or the data that is executed by the CPU 7001. The ROM 7003 is a read-only storage area for holding, for example, the program or the data that performs a fundamental hardware control. The hard disk 7004 is typically a nonvolatile storage unit for holding, for example, the program that is executed by the extended control apparatus 101, or the data that is operated thereby. The hard disk 7004 stores, for example, a boot program, which initializes execution or operation of hardware and software, as well as a plurality of applications, files to be edited, user files, and a network management program. A peripheral interface 7005 controls connecting the peripheral device 171 that implements a specification such as USB, RS-232C Serial, or IEEE 1394. The peripheral device 171 may include, for example, a user authentication apparatus that identifies the user.

Figure 8:
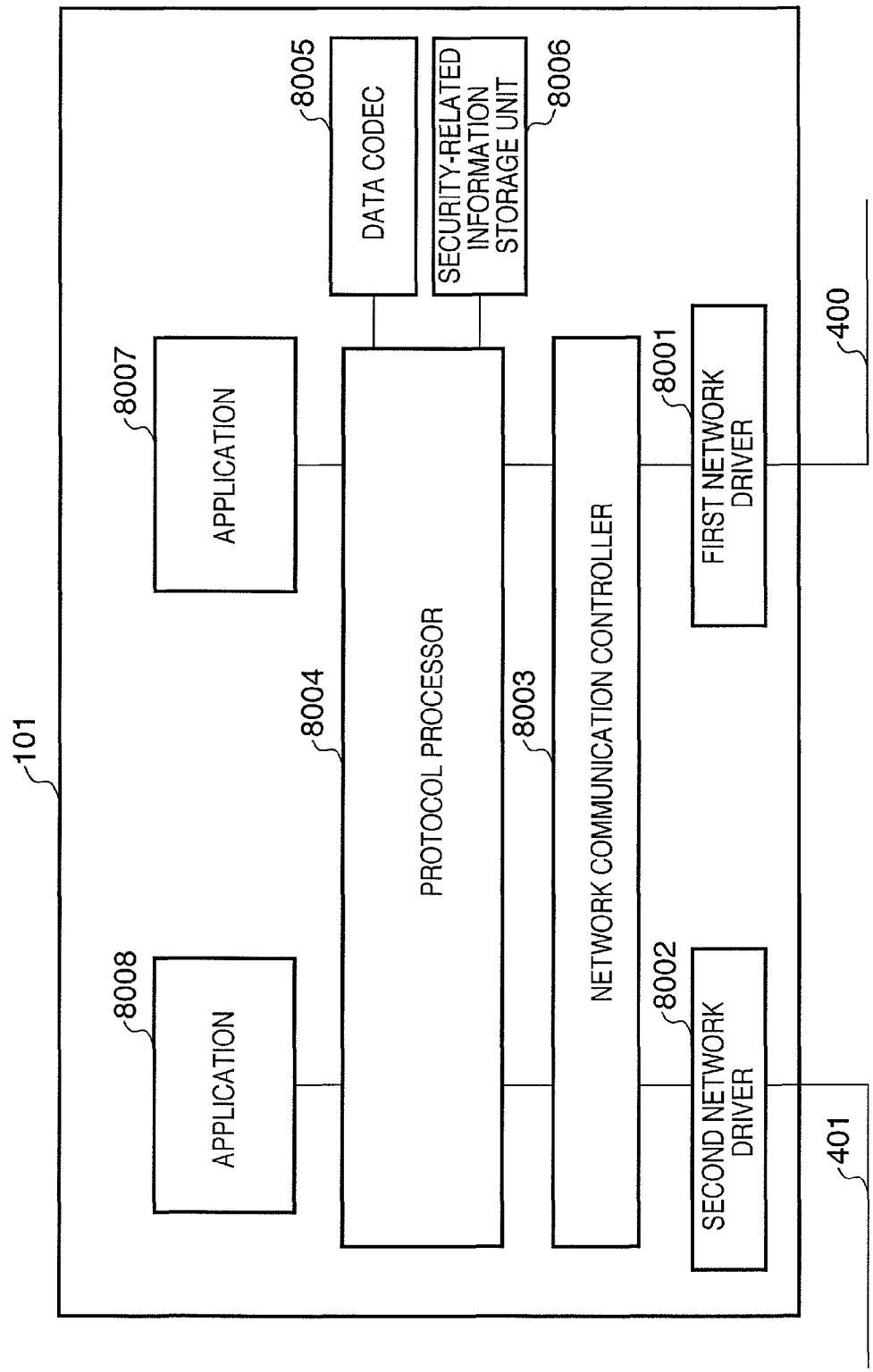
FIG. 8 is a block diagram illustrating a software module configuration of the extended control apparatus, according to the embodiment.

FIG. 8 is a block diagram illustrating a software module configuration of the extended control apparatus 101, according to the embodiment. The software that is processed by the controller 170 of the extended control apparatus 101, in FIG. 2, is implemented as firmware, and executed by the CPU 7001 of the apparatus, in FIG. 7.

A first network driver 8001 controls the first network interface 20 that is connected to the LAN 400, in FIG. 7, and performs transmission and reception of data with the network 400. A second network driver 8002, which is connected to the LAN 401, controls the second network interface 21, in FIG. 7, and performs transmission and reception of data with the network 401.

A network communication controller 8003 inspects all packets received by the first network driver 8001, and transfers a packet that has no relation to an application 8007 to the second network interface 21. All of the packets that are received by the second network interface 21 are inspected, and the packet that has no relation to an application 8008 is transferred to the first network interface 20.

A protocol processor 8004 controls such network protocols as TCP/IP, and employs the IETF's IP Security, or IPSec, to offer a secure network connection. A data codec 8005 performs encryption and decryption of data. A security-related information storage unit 8006 stores the Security Policy Database (SPD).

An application 8007 executes a secure printing function. The application 8007 receives an encrypted print data from the host computer via the LPD protocol, and temporarily stores the print data in its encrypted state on the hard disk 7004, in FIG. 7. It then decrypts the encrypted print data and transmits the print data to the image processing apparatus 100 only when an operation is confirmed to have come from an authorized user. An application 8008 communicates with, and controls, the image processing apparatus 100.

Figure 9:
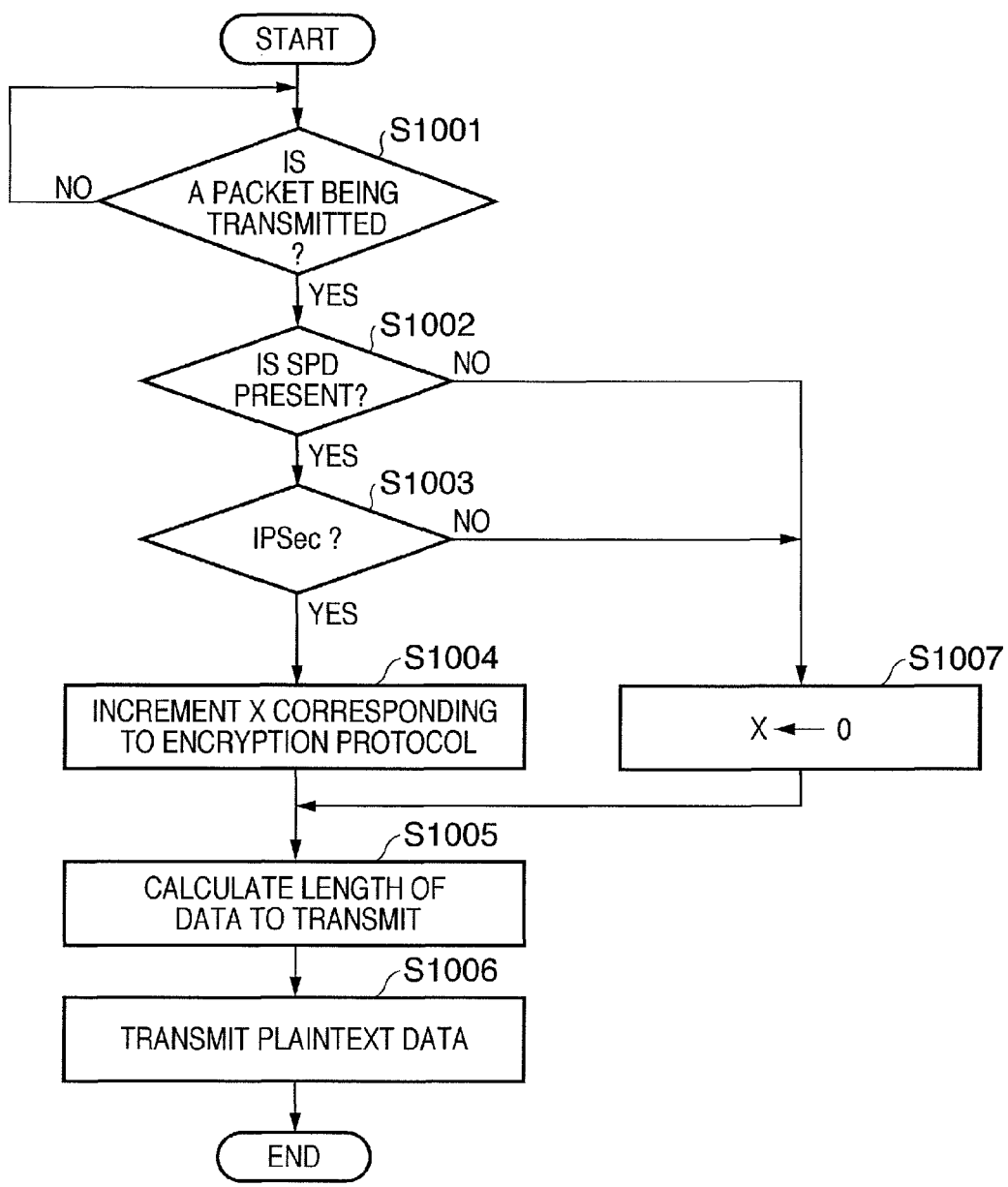
FIG. 9 is a flowchart describing a processing sequence of a protocol processor of the image processing apparatus, according to the embodiment.

The following is a description of the process of protocol processor 5002 of the image processing apparatus 100, in FIG. 5, with reference to the flowchart in FIG. 9.

FIG. 9 is a flowchart describing a processing sequence of the protocol processor 5002 of the image processing apparatus 100, according to the embodiment. The process is executed when the network application 5004 of the image processing apparatus 100 attempts to transmit a packet to the LAN 401. The program that executes the process is stored in the ROM 3014 in FIG. 3, and is executed under the control of the CPU 3012.

In step S1001, the CPU 3012 determines whether or not an attempt is being made to transmit a packet. If the attempt to transmit a packet is being made, the process proceeds to step S1002, wherein it is determined whether or not the SPD is stored in the security-related information storage unit 5003. If it is determined by the CPU 3012 that the SPD is stored in the security-related information storage unit 5003, the process proceeds to step S1003, wherein the CPU 3012 queries the SPD in accordance with the packet's destination IP address, and determines whether or not to apply IPSec. If it is determined in step S1003 that IPSec should be applied, the process proceeds to step S1004, wherein the CPU 3012 queries the SPD in accordance with the packet's destination IP address, selects the encryption protocol to use, and acquires an increment X of the packet size, corresponding to the selected encryption protocol.

Figure 10:
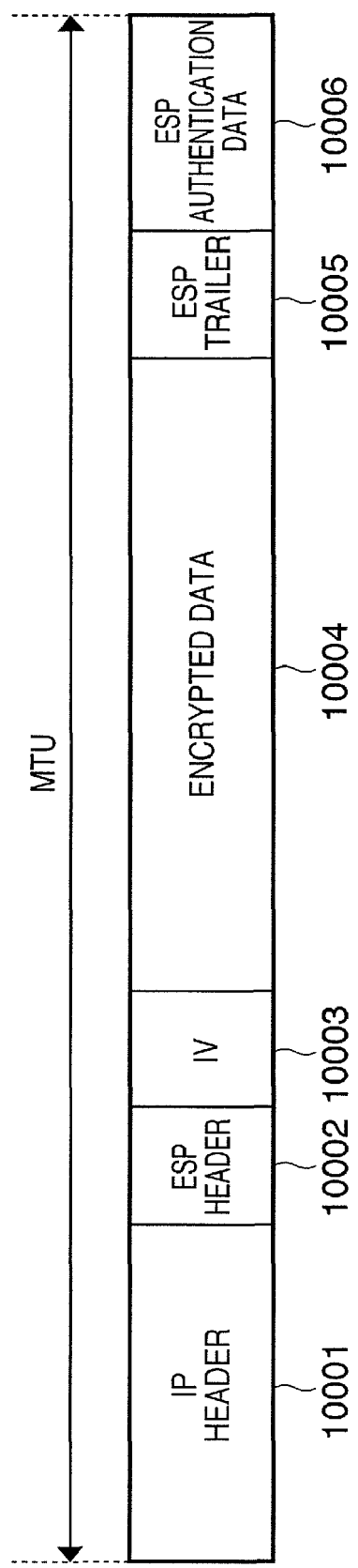
FIG. 10 depicts a view illustrating an example of an IPSec encryption method.

FIG. 10 depicts a view illustrating an example of a packet structure that corresponds to an IPSec encryption protocol.

Reference numeral 10001 denotes an IP header. Reference numeral 10002 denotes an ESP header, wherein is stored a Security Parameter Index (SPI), or a sequence number, for SA identification. Reference numeral 10003 denotes an Initial Vector (IV), which is used in the encryption algorithm. Reference numeral 10004 denotes the data that is encrypted by IPSec. Reference numeral 10005 denotes an ESP trailer for storing a padding data, length of a padding, and a next header. Reference numeral 10006 denotes an ESP authentication data for storing an Integrity Check Value (ICV), corresponding to the fields from the ESP header to the ESP trailer.

In the example shown in FIG. 10, the increment X of the packet size is the total of the sizes of the ESP header 10002, the IV 10003, the ESP trailer 10005, and the ESP authentication data 10006, which are the data required for cipher communication via IPSec.

The process proceeds to step S1005, wherein the data size to be transmitted is determined, by subtracting the size of the IP header, the TCP/UDP header, and the increment X acquired in step S1004, from the MTU of the recipient communication medium. First, the size of the IP header and the TCP/UDP header is subtracted from the MTU to arrive at a specified data size, from which is further subtracted the increment X acquired in step S1004 to arrive at the data size to be transmitted. The process then proceeds to step S1006, wherein the CPU 3012 transmits the plaintext data to the extended control apparatus 101, according to the data size to be transmitted that was determined in step S1005. In concrete terms, the image processing apparatus 100 partitions the image data into segments that are not larger than the data size to be transmitted, and transmits the packet, containing the partitioned image data, the IP header, and the TCP/UDP header, to the extended control apparatus 101.

If, on the other hand, the SPD is not stored in the security-related information storage unit 5003 in step S1002, or if it is determined in step S1003 that IPSec is not being applied, the process proceeds to step S1007, wherein the CPU 3012 sets the increment X to zero and then proceeds to step S1005, and executes the process with the increment X set to zero.

Figure 11:
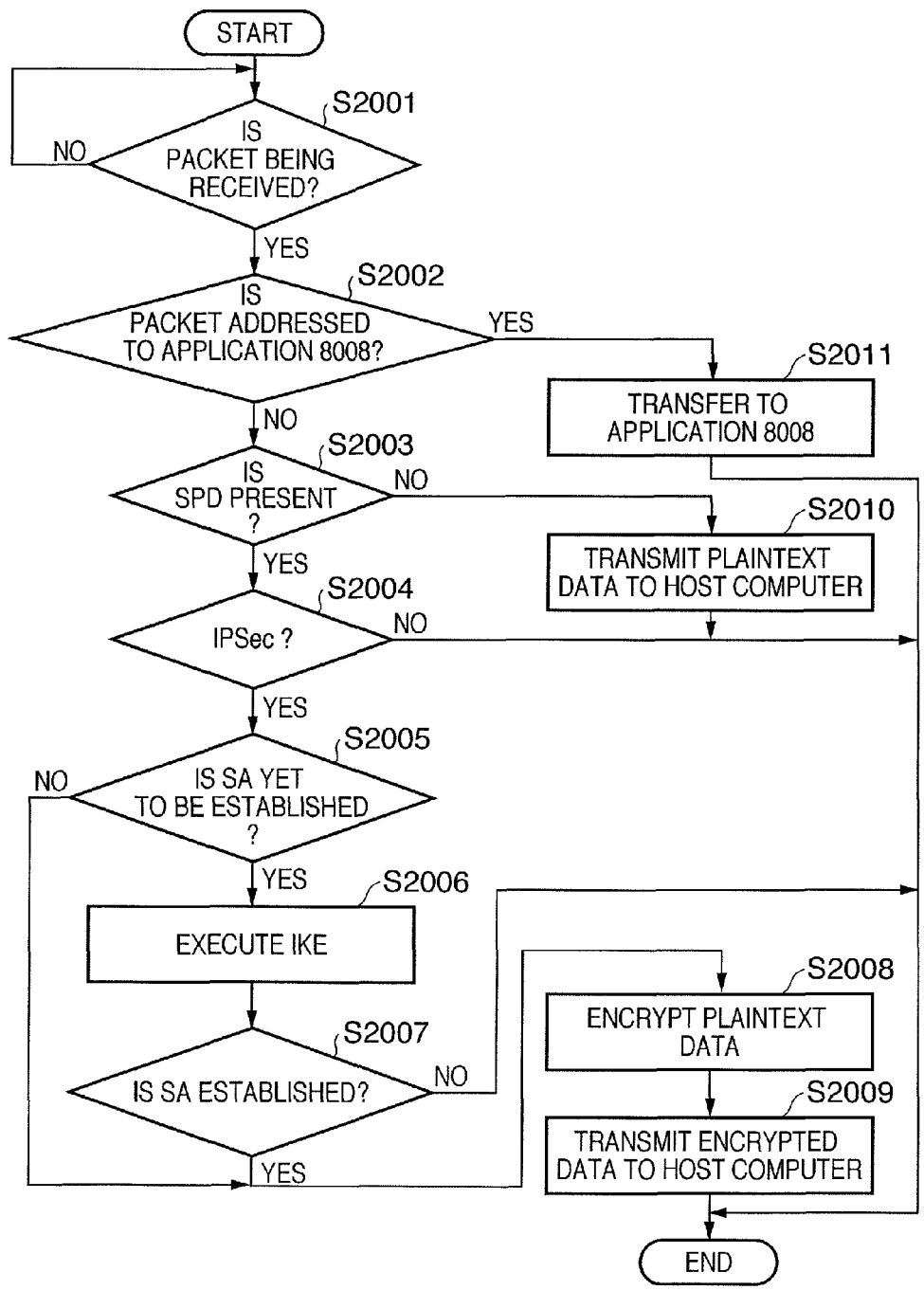
FIG. 11 is a flowchart describing a processing sequence of a protocol processor of the extended control apparatus, according to the embodiment.

The following is a description of the process of the protocol processor 8004 of the extended control apparatus 101, with reference to the flowchart in FIG. 11. The program that executes the process is stored in the ROM 7003 in FIG. 7, and is executed under the control of the CPU 7001.

FIG. 11 is a flowchart describing a processing sequence of the protocol processor 8004 of the extended control apparatus 101, according to the embodiment. The present circumstance presumes that the image processing apparatus 100 initiates a communication of some sort with the host computer 11.

In step S2001, the CPU 7001 of the extended control apparatus 101 determines whether or not the second network interface 21 has received a packet. If it is determined that the second network interface 21 has received a packet, the process proceeds to step S2002, wherein the packet that is received over the LAN 401 is analyzed, and it is determined whether or not a recipient port number of the packet is a port number that is assigned to the application 8008. If it is determined that the recipient port number of the packet is not the port number that is assigned to the application 8008, the process proceeds to step S2003, wherein the CPU 7001 determines whether or not the SPD is stored in the security-related information storage unit 8006. If it is determined that the SPD is stored in the security-related information storage unit 8006, the process proceeds to step S2004, wherein the CPU 7001 queries the SPD in accordance with the packet's destination IP address, and determines whether or not to apply IPSec. If it is determined that IPSec should be applied, the process proceeds to step S2005, wherein the CPU 7001 determines whether or not the SA has yet to be established. If it is determined that the SA has yet to be established, the process proceeds to step S2006, and the process proceeds to step S2008 if it is determined that the SA has been established. In step S2006, the CPU 7001 executes an Internet Key Exchange (IKE) over the first network interface 20 with a host computer that corresponds to the recipient address, for example, the host computer 11.

In step S2007, it is determined whether or not the SA has been established. If the SA has been established, the process proceeds to step S2008, wherein the CPU 7001 has the plaintext data that is contained in the packet that is received from the image processing apparatus 100 encrypted in the data codec 8005, in accordance with the parameters of the SA. For example, in the present circumstance, the image data and the TCP/UDP header that are contained in the packet that is received from the image processing apparatus 100 are encrypted. It would be permissible for the TCP/UDP header that is included in the packet that is received from the image processing apparatus 100 to be encrypted, as well as for a newly created TCP/UDP header to be encrypted. The CPU 7001 generates the ESP header, the IV, the ESP trailer, and the ESP authentication data. In step S2009, the CPU 7001 transmits the data that was encrypted in step S2008 from the first network interface 20 to the host computer 11, and the process terminates. The extended control apparatus 101 attaches the ESP header, the IV, the ESP trailer, the ESP authentication data, and the IP header to the encrypted data, and transmits the packet that contains the encrypted data, the IP header, the ESP header, the IV, the ESP trailer, and the ESP authentication data to the host computer 11. Per the process in FIG. 9, the size of the packet in the present circumstance will be not larger than the MTU.

If, on the other hand, the recipient port number of the packet is the port number that is assigned to the application 8008, the process proceeds to step S2011, wherein the CPU 7001 transmits the plaintext data that is received from the image processing apparatus 100 to the application 8008, and the process terminates.

If, in step S2003, the SPD is not stored in the security-related information storage unit 8006, or if IPSec is not applied in step S2004, the process proceeds to step S2010, wherein the CPU 7001 transfers the plaintext data that is received from the image processing apparatus 100 to the host computer 11, and the process terminates. The extended control apparatus 101 transmits a packet via the first network interface 20 that includes the image data that is included in the packet that is received from the image processing apparatus 100, the TCP/UDP header, and the IP header. It would be permissible for the TCP/UDP header to be either the TCP/UDP header that is included in the packet that is received from the image processing apparatus 100, or a newly created TCP/UDP header.

Figure 12:
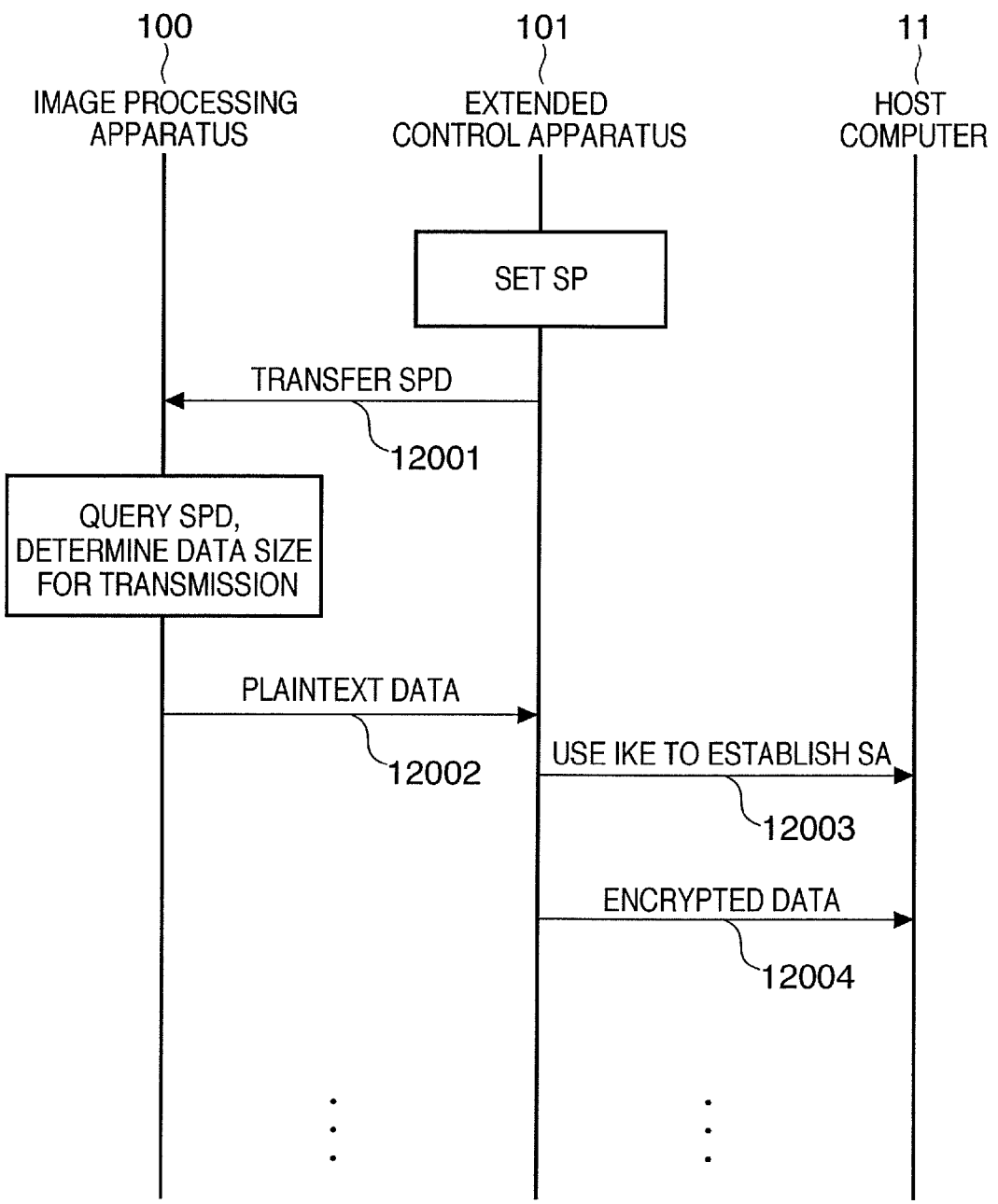
FIG. 12 is a diagram showing an example of a data transfer sequence, according to the embodiment.

FIG. 12 is a sequence diagram illustrating a state of transmitting and receiving a packet between the image processing apparatus 100, the extended control apparatus 101, and the host computer 11, according to the exemplary embodiment. The direction of the temporal axis is presumed to be vertical, from top to bottom.

The extended control apparatus 101 transmits the SPD to the image processing apparatus 100 (12001), in order to notify the image processing apparatus 100 that the user has preset the extended control apparatus 101. When the image processing apparatus 100 initiates a communication of some sort with the host computer 11, the SPD is queried in accordance with the destination address of the packet, and a transmission data size determined. The plaintext data is transmitted to the extended control apparatus 101, according to the transmission data size thus determined (12002). The extended control apparatus 101 executes the IKE (12003). The plaintext data is encrypted in accordance with the parameter of the SA, and the encrypted data is transmitted to the recipient address (12004). The process is repeated until the data transmission is completed.

While an example is depicted that determines the size of the data to be transmitted based on the SPD according the embodiment, the present invention is not limited thereto. It would be permissible, for example, to obtain the SA parameter from the extended control apparatus 101 after the SA is established between the extended control apparatus 101 and the host computer, and determine the data size according to the encryption algorithm of the SA parameter.

While the description according to the exemplary embodiment shows the form of the connection between the extended control apparatus 101 and the image processing apparatus 100 is via a network communication function that the image processing apparatus 100 comprises, the present invention is not limited thereto. It would be permissible, for example, for the form of the connection between the extended control apparatus 101 and the image processing apparatus 100 to be via an extension interface function that the image processing apparatus 100 comprises.

While the description according to the exemplary embodiment shows the image processing apparatus 100 obtaining the security policy database (SPD) from the extended control apparatus 101, the present invention is not limited thereto. It would be permissible for the security policy to be set and stored in the image processing apparatus 100, and for the extended control apparatus 101 to obtain the security policy database (SPD) from the image processing apparatus 100.

It would be permissible for the program code and the related data according to the present invention, as described herein, to be stored on a floppy disk or a CD-ROM, and supplied to the computer therefrom.

The object of the present invention is achieved by supplying a storage medium, on which is written a program code of a software, that is, a control program, that implements the function of the embodiment, to a computer, the image processing apparatus 100, and the extended control apparatus 101, and the central processing unit (CPU) of the computer, the image processing apparatus 100, and the extended control apparatus 101 loading and executing the program code that is stored in the storage medium. A typical method of supplying the program or the data to the computer would be to store the program or the data on a floppy disk, and supplying the program or the data to the computer proper, via a floppy disk drive. In such a circumstance, the function of the embodiment is implemented by the program code itself that is loaded from the storage medium, thus making the storage medium that stores the program code configure the present invention.

As the storage medium that supplies the program code, it would be possible to use, for example, an optical disc, a magneto-optical disk, a magnetic tape, a nonvolatile memory card, or a ROM, in addition to a floppy disk or a hard drive. The execution of the program code that is loaded by the computer, the image processing apparatus 100, and the extended control apparatus 101 is not the only way to implement the function of the embodiment. It goes without saying that a circumstance is also included wherein the function of the embodiment is implemented by a process that is actually performed, in whole or in part, by the operating system or other software running on the computer, the image processing apparatus 100, and the extended control apparatus 101.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-207172, filed Jul. 28, 2006, which is hereby incorporated by reference herein in its entirety.

What is claimed is:

1. An information processing system comprising:
a first information processing apparatus having an encryption function; and
a second information processing apparatus having no encryption function,
wherein the first information processing apparatus comprises:
a first interface configured to communicate with an external device via a first network;
a second interface configured to communicate with the second information processing apparatus via a second network; and
a first controller configured to:
encrypt each of a plurality of items of packet-data that are received from the second information processing apparatus via the second interface, wherein the plurality of items of packet-data are generated by the second information apparatus by segmenting data to be transmitted;
attach data necessary for encryption communication to the encrypted plurality of items of packet-data and transmit the encrypted plurality of items of packet-data to which the data is attached to the external device via the first interface in a case that the first information processing apparatus performs an encryption communication; and
transmit the plurality of items of packet-data received via the second interface to the external device via the first interface without attaching the data necessary for the encryption communication in a case that the first information processing apparatus does not perform the encryption communication, and
wherein the second information processing apparatus comprises a second controller configured to:
segment data to be transmitted into a plurality of items of packet-data in accordance with a data size defined by subtracting a data size of data necessary for the encryption communication from a specified data size in a case that the first information processing apparatus performs the encryption communication;
segment the data to be transmitted into a plurality of items of packet-data, each having the specified data size in a case that the first information processing apparatus does not perform the encryption communication; and
transmit each of the segmented plurality of items of packet-data to the first information processing apparatus.

2. The system according to claim 1, wherein the second controller is further configured to decide the data size of data necessary for the encryption communication in accordance with a type of a protocol that is employed in the encryption communication.

3. The system according to claim 2, wherein the first information processing apparatus transmits security information indicating the type of the protocol that is employed in the encryption communication to the second information processing apparatus.

4. The system according to claim 1, wherein the second controller is further configured to transmit the data, according to the data size (MTU) for the encryption communication by the first information processing apparatus, to the first information processing apparatus in a case where the encrypted communication of the encrypted data is not to be performed.

5. The information processing system according to claim 4, wherein:
the first information processing apparatus transmits security information to the second information processing apparatus, and
the security information denotes whether or not the encryption communication is to be performed upon transmitting a given type of data, on a per recipient basis.

6. The system according to claim 1, wherein the encrypted communication is a communication in accordance with IPSec.

7. A data communication method in an information processing system including a first information processing apparatus having an encryption function and a second information processing apparatus having no encryption function, wherein the first information processing apparatus has a first interface configured to communicate with an external device via a first network, and a second interface configured to communicate with the second information processing apparatus via a second network, the method comprising:
an encrypting step of encrypting, with the first information processing apparatus, each of a plurality of items of packet-data that are received from the second information processing apparatus, wherein the plurality of items of packet-data are generated by the second information apparatus by segmenting data to be transmitted;
a first transmission step of attaching, with the first information processing apparatus, data necessary for encryption communication to each of the encrypted plurality of items of packet-data encrypted in the encrypting step and transmitting the encrypted plurality of items of packet-data to which the data is attached to the external device via the first interface, in a case that the first information processing apparatus performs an encryption communication, and
a second transmission step of transmitting the plurality of items of packet-data received via the second interface to the external device via the first interface without attaching data necessary for the encryption communication in a case that the first information processing apparatus does not perform the encryption communication;
a first segmenting step of segmenting, with the second information processing apparatus, the data to be transmitted into a plurality of items of packet-data in accordance with a data size that is defined by subtracting a data size necessary for the encryption communication from a specified data size in a case that the first information processing apparatus performs the encryption communication;
a second segmenting step of segmenting the data to be transmitted into a plurality of items of packet-data each having the specified data size in a case that the first information processing apparatus does not perform the encryption communication; and a third transmitting step of transmitting, with the second information processing apparatus each of the plurality of packet-data segmented in the segmenting step to the first information processing apparatus.

* * * * *